United States Patent Office 3,667,811
Patented June 6, 1972

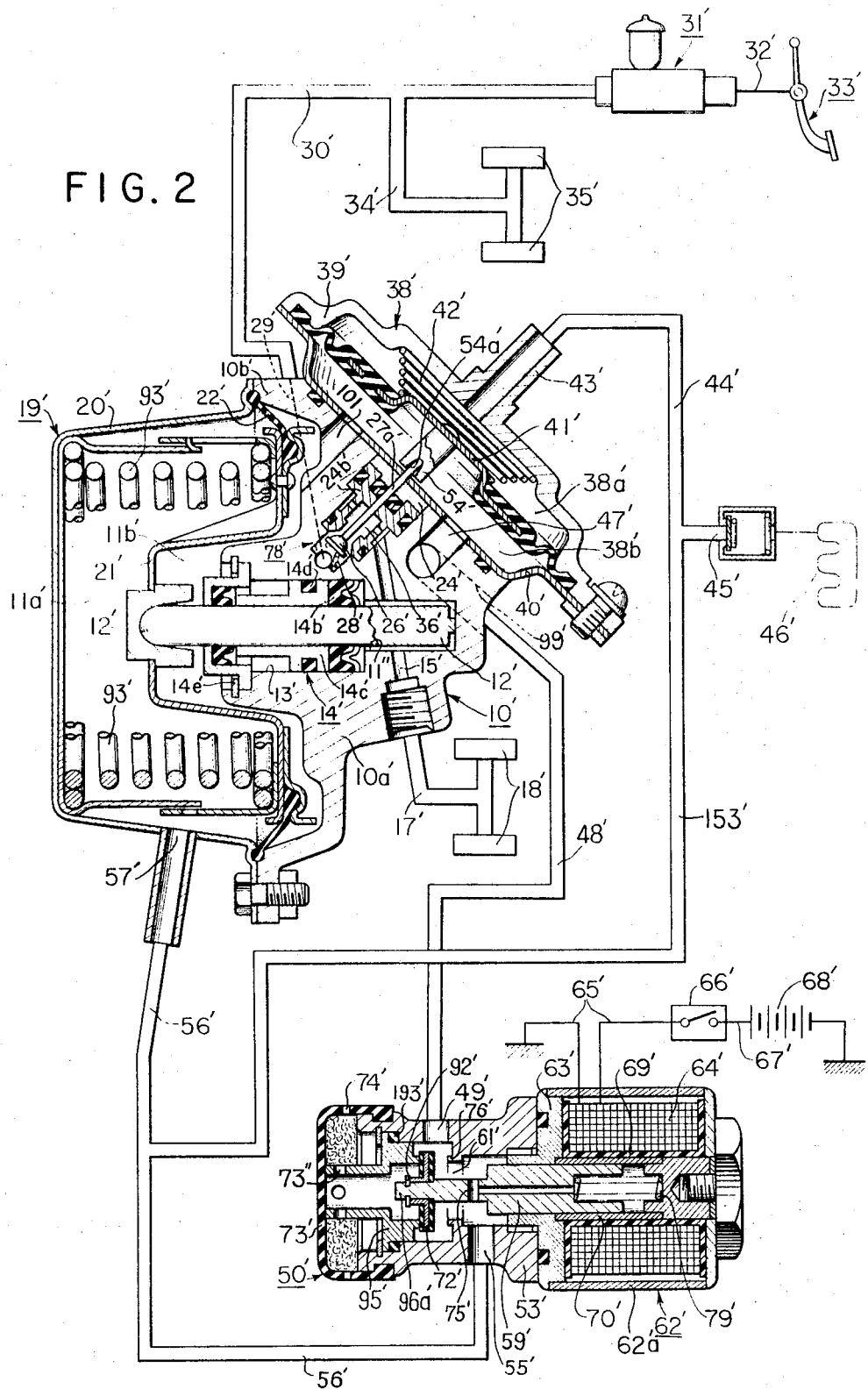

3,667,811
ANTISKID BRAKE CONTROL MECHANISM
Tosiaki Okamoto and Masami Inada, Kariya-shi, Japan, assignors to Aisin Seiki Company Limited, Kariya-shi, Aichi-ken, Japan
Filed Mar. 5, 1970, Ser. No. 16,885
Claims priority, application Japan, Mar. 8, 1969, 44/20,818; Apr. 5, 1969, 44/31,002
Int. Cl. B60t 8/04
U.S. Cl. 303—21 F                                                5 Claims

ABSTRACT OF THE DISCLOSURE

An antiskid brake pressure control mechanism being provided with a first and second pneumatically operated servo assembly, the first servo assembly comprising a diaphragm piston which is urged by a first spring for normally opening a valve in a hydraulic brake apply circuit adapted for on-off control of the fluid communication between the master cylinder and preferred wheel cylinder assemblies, with both being provided in the hydraulic brake system to be controlled by a change-off valve actuated by a skid sensor, and second servo assembly comprising a diaphraghm piston urged by a second spring and adapted for actuating a plunger upon the operation of said first servo assembly for increasing or decreasing as the case may be, the effective volume of said hydraulic brake circuit part leading to said preferred wheel cylinder assemblies for decreasing or increasing the hydraulic brake pressure prevailing therein.

---

This invention relates to improvements in and relating to an antiskid brake control mechanism for powered and wheeled vehicles, especially for automotive use. More specifically, it relates to an antiskid brake mechanism for a hydraulic wheel brake system of the above kind adapted for operating in a more reliable and quicker manner than the case of prior comparative mechanisms.

In the representative and comparative prior antiskid brake control mechanism for the hydraulic brake system of the above kind, there is provided a plunger which is actuated by a servo-means, the movement of said plunger, when actuated, being utilized for the interruption of master cylinder pressure. There is provided in the hydraulic brake system such means which operates in such a way that the thus cut-off circuit part of the hydraulic brake system is, at the same time, subjected to a volumetric increase for effecting a corresponding pressure reduction within said circuit part, so as to prevent otherwise possible antiskid phenomenon caused by occasional overbraking.

It is a main object of the invention to provide an antiskid brake control mechanism capable of providing a continued brake function, even when encountered with a pipe breakage, oil circuit bursting or the like occasional trouble in the hydraulic brake system.

It is a still further object of the invention to provide a control mechanism of the above kind, capable of functioning in a more accurate and quicker way than the conventional comparative mechanisms.

In the control mechanism according to this invention, there are provided a first and a second servo-means, the former comprising a diaphragm piston which is urged by spring means for normally opening a valve means adapted for on-off control of the fluid communication between the master cylinder and the wheel cylinder means, the both being provided in the hydraulic brake system to be controlled by the inventive mechanism, and the latter servo-means comprising equally a diaphragm piston urged by spring means and adapted for actuating a plunger upon the operation of said first servo-means for increase or decrease, as the case may be, of the effective volume of said hydraulic brake circuit part leading to said wheel cylinder means for decrease or increase of the hydraulic brake pressure prevailing therein.

These and further objects, features and advantages of the invention will become more apparent when read in the following detailed description of the invention by reference to the accompanying drawings illustrative of two preferred embodiments of the invention.

FIG. 2 is a similar view to FIG. 1 wherein, however, a similar hydraulic brake system fitted with a preferred second embodiment of the antiskid mechanism according to the invention.

Figure 1:
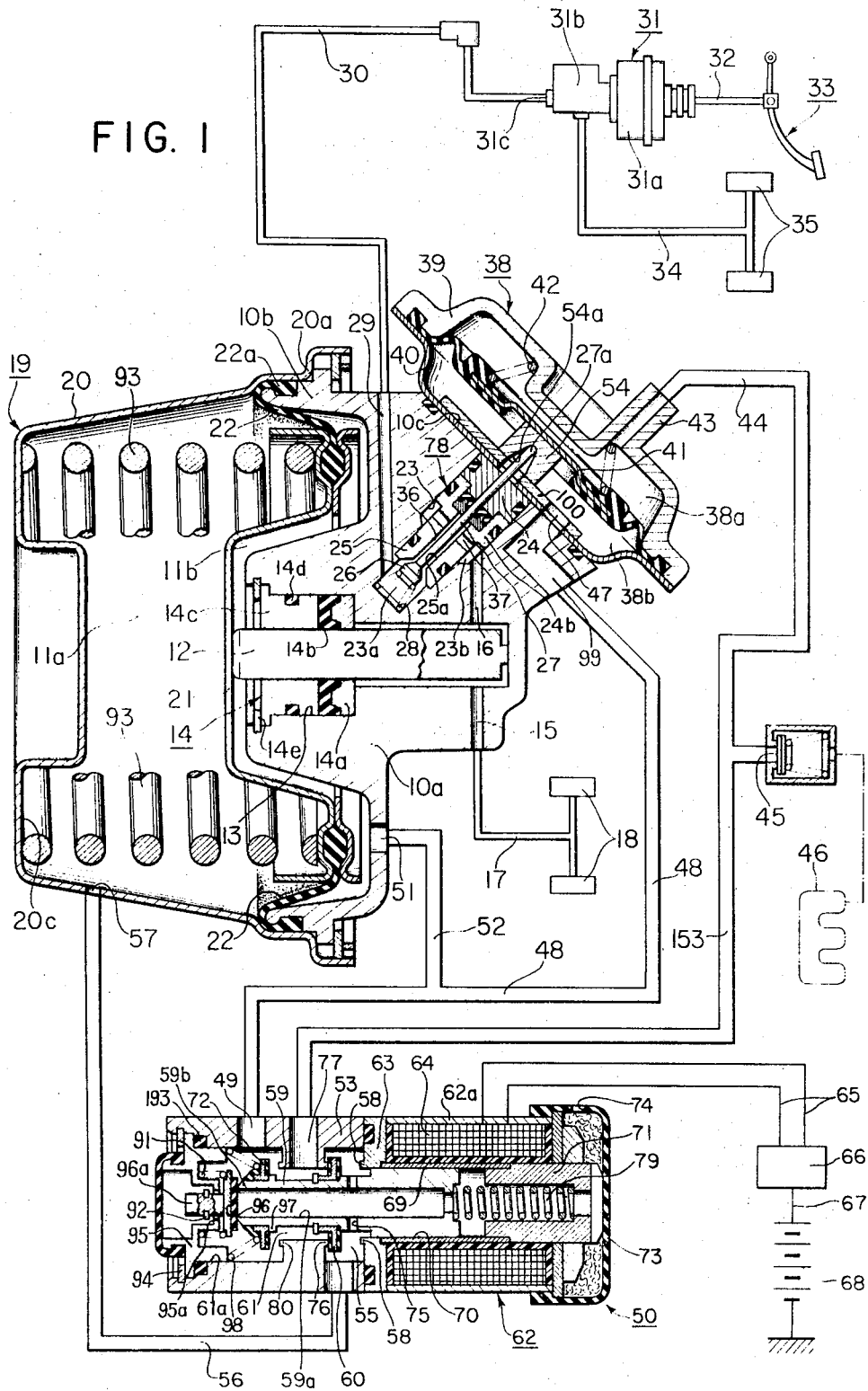
FIG. 1 is a schematic representation of an automotive hydraulic brake system fitted with a preferred first embodiment of the invention wherein, however, several parts thereof are shown in a highly simplified form by way of blocks and the like style and several parts are illustrated in section for demonstrating inside working parts in a more clear way.

Referring now to the accompanying drawings, several preferred embodiments of the invention will be described hereinafter in detail.

In FIG. 1, the numeral 10 denotes generally a pressure reduction control unit comprising a main body 10a which is rigidly mounted on the chassis, not shown, of an automotive vehicle, although the fixedly mounted means have been omitted from the drawing only for simplicity. The main body 10a is formed with a cylinder bore 11 and a plunger 12 which is mounted concentrically within said bore and arranged to be movable in the axial direction thereof.

The body 10a of the unit 10 is further formed with a cylindrical, enlarged and stepped recess 13 which is concentric with said bore 11 and kept in communication therewith. Within this recess 13, there is provided a sealing package, generally shown at 14, and comprising an end disk 14a, a resilient sealing disk 14b, a flanged sleeve 14c fitted with a sealing ring 14d; and a retainer spring clip 14e, thereby said plunger 12 being mounted axially movably and in a sealed way.

The main body 10a of the unit 10 is further formed with hydraulic ports 15 and 16, of which the former port 15 is kept in hydraulic communication with said cylinder bore 11, on the one hand, and with conventional wheel cylinder means 18 provided preferably for the rear wheels of the vehicle, through piping means 17, on the other hand. The latter port 16 is kept in fluid communication with a check valve unit, generally shown at 78 in FIG. 1.

A pneumatic servomechanism constituting a second servo-means in the aforementioned sense, and generally shown at 19 in the left-hand side of FIG. 1, comprises a hollow housing 20 which is sealingly and fixedly attached at its inner end 20a with a flange part 10b formed at the left-hand end of the body 10a of said unit 10.

A piston member 21 is attached rigidly at its outer periphery with a resilient diaphragm 22, the outer periphery of the latter being thickened at 22a and held firmly in position by being squeezed under pressure between the housing end 20a and the body flange 10b. By the provision of the diaphragm piston 21; 22, the interior space of the housing 20 is divided into two spaces 11a and 11b, the volumes of these spaces being naturally variable, as will be more fully described hereinafter.

An urging coil spring 93 is inserted under pressure between the diaphragm piston and the outer end wall, shown at 20c, of the housing 20, thereby the piston urged to move rightwards in FIG. 1 and kept in pressure engagement with the left-hand extremity of plunger 12 which protrudes into the right-hand pneumatic chamber 11b.

Within the body 10a of the unit 10, an inclined and stepped bore 23 is formed in which centrally bored sealing members 24 and 25 are received in position; a check valve member 26 having an elongated stem 27 made integral therewith and slidably passing through said bored sealing member is arranged within said inclined bore 23 so as to serve as a main working element of the check valve unit 78.

An urging spiral spring 28 is provided in the inner end space, shown at 23a, of the bore 23, for urging resiliently to move the check valve 26; 27 in the right-hand and upward direction in FIG. 1. The bore end space 23a is fluidically connected through a duct 29 formed in the body 10a; and a connection piping 30 to the hydraulic output end 31c of hydraulic section 31b of a conventional master cylinder 31 which comprises also a pneumatic booster section 31a mechanically connected through a pusher rod 32 with a conventional manual brake means such as a foot-operated brake pedal, as shown at 33. For more economically designed automotive vehicles, the pneumatic section can be dispensed with, as well known among those skilled in the art.

The hydraulic section 31b is directly connected through a connection piping means 34 to a further conventional wheel brake cylinder means 35, arranged preferably for the front wheels, not shown, of the vehicle. As seen, brake cylinder means 18 and 35 are shown only schematically by rectangular blocks on account of their very popularity. In consideration of the function of the check valve unit 78 to be described, the bore end chamber 23a can be defined as "valving chamber." This valving chamber 23a is normally fluidically connected, when the valve 26 is kept in its open position as shown, through a ring space 36 formed between valve stem 27 and the bore wall 25a of second sealing member 25; lateral passage means 37 formed radially through the latter member; a part, shown at 23b, of the bore 23; port 16; a ring-shaped space formed between the bore wall 11 and plunger 12; port 15 and piping 17, with the wheel cylinder means 18.

It should be noted at this stage that although the wheel cylinder means 18 are arranged preferably for braking the rear wheels of the vehicle, they can be used for the front wheels. In this modified arrangement, the similar means shown at 35 should be directed for cooperation with the vehicle's rear wheels.

A further pneumatically operated servomechanism is shown generally at 38, which constitutes a first servo-means in the aforementioned sense and comprises a housing consisting of two elements 39 and 40 united rigidly together by means of fixing bolts or the like conventional means, although not specifically shown. The body 10 is formed with a flat surface 10c on which the inner housing member 40 is fixedly attached by means of bolts or the like conventional fixing means, although not shown, and stiffened from inside by a reinforcing plate 100 which is fixedly attached to the member 40 by means of proper screw means, not shown.

Within the interior space of the said housing a diaphragm piston 41 backed up with an urging spiral spring 42 is movably arranged, thereby the interior space of the housing being divided into two pneumatic chambers 38a and 38b. The housing member 39 is formed with a port 43 connected sealedly with a piping 44 which leads through a check valve unit 45 to a vacuum source 46 formed preferably into a suction manifold, only schematically shown, of the drive engine, not shown, of the vehicle. On the other hand, the second pneumatic chamber 38b is connected fluidically through a port 47 bored through the inner housing element 40 and plate 100; a duct 99; a piping 48 and a port 49 to a change-off valve unit, generally shown at 50.

Second pneumatic chamber 11b is fluidically connected through port 51; piping 52; part of said piping 48 and port 49 to the same unit 50.

The piping 44 is connected with a branch-off piping 53 which is connected pneumatically with the same unit 50 through a port 77.

The diaphragm piston 41 is rigidly attached with an actuator member 54 which is formed with a recess 54a adapted for receiving the free end, shown at 27a of the valve stem 27.

The change-off valve unit 50 comprises a main body 53 which is formed, in addition to said ports 49 and 77, with a further port 55, which is kept in fluid connection with a piping 56 and a port 57 with the first pneumatic chamber 11a of the unit 19, as shown.

Within the port 55, the body member 53 is formed with a valve seat 58; a hollow plunger 59 which is mounted axially movably within the interior space 61 of the body member 53 and formed with a valve member 60 adapted for cooperation with the valve seat 58, is provided as will be more fully described.

A plunger section 62 comprises a housing member 62a which is rigidly attached through an intermediate member 63 to the right-hand end of said housing 53, although the fixing means serving for this purpose have been omitted from the drawing only for simplicity. The housing member 62a encases a solenoid coil 64 which is electrically connected through conductor means 65 to a conventional wheel-lock sensing unit 66, the electrical input thereof being further electrically connected through conductor means 67 to the positive side of a D.C.-source 68, the negative side of which is connected to earth, as shown.

Solenoid coil 64 is wound on a bobbin 69 to which a guide sleeve 70 is rigidly attached, the latter being also fixed to said intermediate member 63 and arranged to slidingly guide said hollow plunger 59, although the fixingly attaching means have been omitted from the drawing for simplicity. A back-up spring 79 is mounted under pressure between the right-hand end of said plunger 59 and a sleeve-like spring mount 71 fixedly mounted within said housing member 62a, the plunger being formed with a second valve member 72 separated axially a certain predetermined distance from the first valve member 60. The housing 53 is further formed with a second and a third valve seat 76 and 80 adapted for cooperation with the first and second valve member 60 and 72, respectively, as will be more fully described hereinafter.

At the right-hand end of the solenoid section, a conventional air cleaner 73 is attached fixedly, an air intake opening being provided at 74.

Plunger 59 is formed with lateral passageways 75 at an intermediate point between its end extremities, serving for fluid communication between the interior of plunger bore 59a and the port 55 when the plunger 59 is positioned as shown. Second valve 72 is axially slidably mounted on the outer peripheral surface of said hollow plunger only a limited distance. For the limitation of axial sliding movement of the second valve 72 backed up by an urging spring 98, the plunger is formed thereon with a stop collar 97 against which the valve 72 normally abuts under pressure. With leftward movement of the plunger, the valve 72 is moved resiliently under the influence of spring action at 98 and in the same direction, until the valve is brought into abutment with third valve seat 80.

The otherwise opened left-hand end of the plunger bore 59a is normally closed by a valve 96 having a stem 96a which is slidably guided by an opening 95a of a plug piece 95 fixedly attached to the end of an enlarged bore part 61a of main body 53 by means of sealing ring 193 and snap spring 94. The stem 96a is provided with a snap spring 92 serving as a stop for the prevention of slipping off of the stem, when the valve 96 together with its stem is moved rightwards under the urging force exerted thereupon by an urging coil spring 91 inserted between the valve and the plug piece.

In order to attain such operational mode that the second servo-means 19 is brought into actuation only when the first servo-means 38 has been actuated, the spring force at 42 is normally selected to be smaller than that of the urging spring at 93.

The operation of the first embodiment so far shown and described is as follows:

At first, the regular braking operation of the brake system will be described under such assumption that there is encountered any wheel lock phenomenon.

When a driver actuates the brake pedal in the braking direction by exerting a foot pressure upon the pedal, the hydraulic liquid, such as oil, prevailing within the hydraulic section 31b of the master cylinder 31 is pressurized as conventionally; thus the pressure oil will be transmitted therefrom through piping 34 to first wheel cylinder means 35, on the one hand, and, at the same time, through several constituent parts of the braking system, being denoted 31c; 30; 29; 23a; 36; 37; 23b; 16; 11; 15 and 17 to second wheel cylinder means 18. Therefore, wheel cylinder means 18 and 35 are brought into actuation.

In this case, solenoid 64 is not affected in anyway so that the first chamber 38a of first servo-means 38 is kept in fluid communication through the way, 43; 44 and 45 with vacuum source 46. In the similar way, the second chamber 38b is kept in communication through the way comprising: 47; 99; 48; 49; 61; 77; 153 and 45 with the same vacuum source 46.

The first chamber 11a of second servo-means 19 is connected through the way comprising: 57; 56; 55; 75; 59a and 74 with ambient atmosphere, while the second chamber 11b is kept in fluid connection with vacuum source 46 through the way comprising: 51; 52; 48; 49; 61 and so on.

Diaphragm piston 41 is urged resiliently by the spring 42 so as to occupy the shown position and thus the valve member 26 is kept in its open position again as shown. At the present stage, diaphragm piston 21; 22 is kept in its right-hand extreme position as shown, on account of a pneumatic pressure differential maintained between the first chamber 11a and 11b and the urging resilient force exerted by the actuating spring 93. Therefore, even when the hydraulic pressure coming from the master cylinder 31 is applied to the bore 11, no influence is invited in the position of plunger 12 which is thus held at its right-hand extreme position as shown.

When the driver exerts a substantially increased foot pressure upon the pedal and thus the hydraulic brake pressure is increased to such a degree that the adhesion force of the vehicle wheels relative to the road surface along which the vehicle is travelling, will reach almost its maximum value, the braking condition may be such that a wheel lock is about to take place. At the final stage of the overbraking, the skid sensor 66 of the conventional design senses this braking stage and an output signal in the form of a continuous electrical current will be delivered therefrom and transmitted through conductors 65 to solenoid 64 which is thus brought into energization, thereby the plunger 59 being moved rightwards from the position shown. By this rightwards movement of the plunger, the first valve 60 carried thereby is separated from contact with second seat 76 and will be brought into pressure and sealing contact with first seat 58, so as to connect fluidically the port 77 kept in pneumatic connection with vacuum source 46, with the port 55 which is pneumatically connected with the first chamber 11a of the second servo-means 19. At the same time, the second valve 72 is brought into pressure contact with third seat 80 which is thus closed. On the other hand, the third valve 96 is separated from the left-hand end 59b of the hollow plunger 59, acting as fourth valve seat. An excess rightward movement of the third valve 96 urged by back-up spring 91 is prevented by the stop 92 which will abut, in this case, against the plug piece 95. Upon completion of these movements of the several valves, the change-off operation of the solenoid-operated change-off valve unit is completed.

At this stage, the port 49 is kept in pneumatic communication through the bore 59a of plunger 59 and the intake opening 74 of air cleaner 50 with ambient atmosphere. On the other hand, the hitherto established vacuum connection of the port 49 with the vacuum source 46 is interrupted by the closure of the second valve 72 with the third valve seat 80.

Atmospheric air will now invade from outside of the change-off valve unit, through intake opening 74; the interior space of air cleaner 50; the bore 59a of plunger 59; the now opened valve space between valve 96 and fourth valve seat 59b; port 49; piping 48; duct 99 and port 47 into the second chamber 38b of the first servo-means 38, thereby a substantial pressure difference being created and maintained between the both chambers 38a and 38b. In this way, the diaphragm piston 41 urged to move outwards against the action of its back-up spring 42, thereby the valve 26 being brought into its closed position under the action of its back-up spring 28, so as to interrupt the hitherto established fluid communication between port 16 and port 29. By this fluidic interruption, the hitherto established delivery of pressure oil from the master cylinder 31 to the wheel cylinders 18 is also positively interrupted.

On the other hand, atmospheric pressure air is delivered from piping 48 through piping 52 and port 51 into the second chamber 11b of the second servo-means 19. The first chamber 11a is brought into fluid communication through the way comprising: 57; 56; 55; 77; 53 and 45 with vacuum source 46, and thus, vacuum will prevail in the chamber. In this way, the pneumatic pressure conditions in these chambers are reversed, and a pneumatic pressure difference in the reverse direction will act upon the diaphragm piston 21; 22 which is then pneumatically urged to move leftwards against the action of its back-up spring 93. Since the bore space 11 is filled with pressurized oil, the plunger 12 will move in the left-hand direction, so as to follow up with the said leftward movement of the diaphragm piston 21. By this leftward movement of plunger 12, the effective volume of the part of hydraulic brake circuit at 17, including wheel cylinder means 18, will be correspondingly increased and thus the hydraulic pressure prevailing within the brake pressure part 17 and the cylinder means 18 will be correspondingly decreased, for avoiding any disadvantageous wheel lock. This operational mode is maintained, so far as the skid signal is continued to deliver from the skid sensor 66.

By the decrease of the hydraulic brake pressure in the above sense, the braking conditions will become far from the near-skid one and the skid signal will be ceased to deliver from the skid sensor 66. Then, all the working constituents will return to the position shown. In practice, however, the aforementioned antiskid operation will be repeated at a considerably high frequency during a sudden and excessive brake application.

It will be easily seen from the foregoing that the aforementioned brake pressure control mechanism can operate well for satisfying the desirous antiskid operation. It should be mentioned that even with a breakage of the back-up spring fitted in the second servo-means, the master pressure can be nevertheless supplied to the wheel cylinder means 18.

Even with breakage of diaphragm 22, the desired hydraulic pressure cut-off may nevertheless be brought about by means of the first servo-means. In addition, the first servo-means can operate regardless of the position of the second servo-means and thus the control mechanism so far described will follow in a quicker and more sensitive way to the instruction signal delivered from the skid sensor 66, so as to perform optimumly the desired brake pressure control. Finally, since the check valve 26 is normally kept open by the first servo-means, the braking function will be performed when other main working part or parts is/are disabled by one or other cause.

Next, referring to FIG. 2, a second embodiment of the invention will be described in detail.

Firstly, it should be noted that the constituent parts denoted with the following reference numerals are similar in their function to those having same references less each a prime, irrespective of occasional difference in their physical configuration.

10'; 10a'; 10b'; 11"; 11a'; 11b'; 12'; 13'; 14'; 14b'; 14c'; 14d'; 14e'; 15'; 17'; 18'; 19'; 20'; 21'; 22'; 23a'; 24'; 24b'; 26'; 27a'; 28'; 29'; 30'; 31'; 32'; 33'; 34'; 35'; 36'; 38'; 38a'; 38b'; 39'; 40'; 41'; 42'; 43'; 44'; 45'; 46'; 47'; 48'; 49'; 50'; 53'; 54'; 54a'; 55'; 56'; 57'; 59'; 61'; 62'; 62a; 63'; 64'; 65'; 66'; 67'; 68'; 69'; 70'; 72'; 73'; 73"; 74'; 75'; 76'; 78'; 79'; 92'; 93'; 95'; 96a'; 99'; 153'; and 193';

Further constituents will be described below together with the overall function of the brake system.

The operation of the second embodiment is as follows:

The regular braking function is substantially similar to that in the foregoing embodiment so that further specific description thereof would not be necessary for better understanding of the invention.

When the driver exerts a sudden and excessive braking effort liable to invite wheel skid, an instruction signal will be delivered again from the skid sensor 66' to solenoid coil 64'. With the solenoid thus energized, the plunger 59' will be urged to move rightwards against the action of its back-up spring 79', so as to bring the single valve member 72', which is fixedly mounted on the plunger in this case, into pressure contact with valve seat 76'. In this way, the hitherto maintained vacuum connection between 49' and 55' is thus interrupted.

On the other hand, atmospheric pressure air will flow from outside ambient atmosphere through ports 73' and 73"; bore space 61' of main body 53'; port 49'; piping 48'; duct 99' and port 47' into the second chamber 38b' of the first servo-means 38', thus a substantial pressure differential being created and maintained across diaphragm piston 41' as before.

The diaphragm piston 41' is moved thus outwards against the action of back-up spring 42'. In this way, the valve 26' is closed under the action of back-up spring 28', assisted by hydraulic pressure prevailing in the valve chamber 23a' thus a cut-off operation of hydraulic brake pressure supplied to the wheel cylinder means 18' being brought about.

Since the second chamber 38b' of the first servo-means 38' is kept always in fluid communication with the second chamber 11b' of the second servo-means 19' by means of a duct 101 bored in the body 10a', ambient air pressure will flow from the former chamber through the duct into the latter chamber. Therefore, a substantial pneumatic pressure differential will be created and maintained across the diaphragm piston 21'; 22' which is then urged pneumatically to move leftwards against the action of its back-up spring 93'. The plunger 12' will be urged hydraulically to follow up after the said leftward movement of the diaphragm piston so that the effective volume of the hydraulic brake circuit part 17' including the wheel cylinder means 18' is increased and the brake pressure prevailing therein is correspondingly decreased for avoiding otherwise possible wheel lock. This operation is naturally continued, so far as the skid-preventing signal is continued to deliver from the skid sensor 66', in the similar way as before.

Further operation of the brake pressure control mechanism is substantially same as that of the foregoing first embodiment, thus no further analysis thereof would be necessary to set forth for better understanding of the invention.

It will be, however, noted from the foregoing that when the plunger 12' is moved leftwards and will return to the right-hand position, the valve member 26' of the check valve unit is released for applying the master cylinder pressure, and indeed, in advance of completion of the complete return movement of the plunger. In this way, an accelerated brake pressure increase to be supplied to wheel cylinder means 18' can be realized for quicker brake reapplication. Further effects are similar to those which have been obtained with the first embodiment.

What we claim is:

1. An antiskid brake pressure control mechanism, comprising a skid sensor for sensing a skid or near skid condition of hydraulically braked vehicle wheels and delivering an electric instruction signal; and a port-controlling change-off valve means operatively connected to said skid sensor and having a valve being actuated by said signal, said mechanism being characterized by the provision of a first servo-means having a diaphragm piston therein, said diaphragm piston being spring-loaded and establishing two variable volume chambers thereacross; a valve means operatively connected to and actuated by said diaphragm piston and being normally kept in its open position by said spring, said diaphragm piston being adapted for being actuated by a first pressure differential between said both chambers and said valve means being arranged for on-off control of a fluid passage connecting a conventional master cylinder and a conventional wheel cylinder means; and a second servo-means having a spring-loaded diaphragm piston therein, said diaphragm piston establishing two variable volume chambers thereacross; a plunger operatively connected to and actuated by said second diaphragm piston, said plunger adapted for increasing or decreasing the effective volume of a passage leading from said valve means to said wheel cylinder means, said second diaphragm piston being adapted for being actuated by a second pressure differential between said both chambers of said second servo-means, said plunger being normally maintained in a position for maintaining said effective volume to a certain minimum valve by said spring, said first servo-means being dimensionally smaller than said second servo-means and said first pressure differential required for urging the diaphragm piston of said first servo-means to move in the direction for interrupting said fluid passage being of a smaller value than that required for said second pressure differential to urge the second diaphragm of said second servo-means to move in the direction for increasing said volume, said first and second servo-means being operatively connected to said change-off valve means for controlling the differential pressure thereof.

2. The antiskid brake pressure control mechanism claimed in claim 1, wherein one of said two variable volume chambers of said first servo-means is communicated with a vacuum source at all times, the other of said variable volume chamber of said first servo means is communicated with said vacuum source through said change-off valve, said first diaphragm piston being normally urged by said spring provided in said one of said chambers to move in the direction for opening said valve means, said change-off valve being actuated by a skid sensor in case of a wheel skid condition to block said other chamber of said first servo-means and introduce atmospheric pressure into said other chamber for actuating said diaphragm piston to close said valve means, one of said two variable volume chambers of said second servo-means being normally communicated with said vacuum source through said change-off valve and the other chamber being normally communicated with atmospheric pressure through said change-off valve when said change-off valve is not actuated, said spring of said second servo-means being provided in said other chamber of said second servo-means to cause said second diaphragm piston to urge said plunger in the direction for maintaining said effective volume at a certain minimum value, said change-off valve being actuated by said skid sensor upon sensing a wheel skid condition to bring said one of said both chambers of said second servo-means into communication with atmospheric pressure and the other chamber of said second servo-means into communication with said vacuum source to actuate said second diaphragm piston to move said plunger in the direction for increasing said effective volume to cause a decrease in braking pressure being applied to said preferred wheel cylinder.

3. The antiskid brake pressure control mechanism as claimed in claim 1 wherein one of said two variable volume chambers of said first servo-means is maintained in communication with a vacuum source at all times, the other of said variable volume chambers of said first servo-means being communicated with said vacuum source through said change-off valve, said first diaphragm piston being normally urged by said spring provided in said one of said chambers of said first servo-means to move in the direction for opening said valve means, one of said two variable volume chambers of said second servo-means being communicated directly with said vacuum source through a first conduit means communicating with said one chamber of said first servo-means which is always maintained in communication with said vacuum source, said spring of the second servo-means is provided in said one chamber of said second servo-means, said second diaphragm piston urging said plunger for maintaining said effective volume at a certain minimum value, a second conduit means for communicating said other chamber of said first servo-means with the other chamber of said second servo-means, said change-off valve being actuated by said skid sensor in response to a wheel skid condition to block communication of said other chamber of said first servo-means with said vacuum source and introduce atmospheric pressure into said other chamber of said first-servo means to create a differential pressure thereon for actuating said diaphragm piston to close said valve means and to introduce atmospheric pressure into the said other chamber of said second servo-means to actuate said second diaphragm piston acting upon said plunger so as to increase said effective volume.

4. The mechanism as set forth in claim 3, wherein said mechanism comprises a main body, a housing of said first servo-means and a housing of said second servo-means being fixed in a unitary structure by uniting with said main body.

5. The mechanism as set forth in claim 4, wherein said second conduit means comprises a passage means formed in said main body whereby, in case of a wheel skid condition, the chamber of said first servo-means adapted for being introduced with atmospheric pressure to close said valve means and the chamber of said second servo-means adapted for being introduced with atmospheric pressure in case of wheel skid conditions to operate said plunger in the direction of increase of said effective volume are kept normally in communication with each other.

References Cited

UNITED STATES PATENTS

| 3,480,335 | 11/1969 | Inada | 303—21 F |
| 3,066,988 | 12/1962 | McRae | 303—21 F UX |
| 3,497,269 | 2/1970 | Van Wicklin Jr. | 303—21 F |

MILTON BUCHLER, Primary Examiner

J. J. McLAUGHLIN, Assistant Examiner

U.S. Cl. X.R.

188—181 A; 303—61